K. HOEPFNER.
LATHE.
APPLICATION FILED FEB. 3, 1913.

1,095,278.

Patented May 5, 1914.

3 SHEETS—SHEET 1.

WITNESSES:
W. S. Ziegler
Frederick Howard

INVENTOR.
Karl Hoepfner

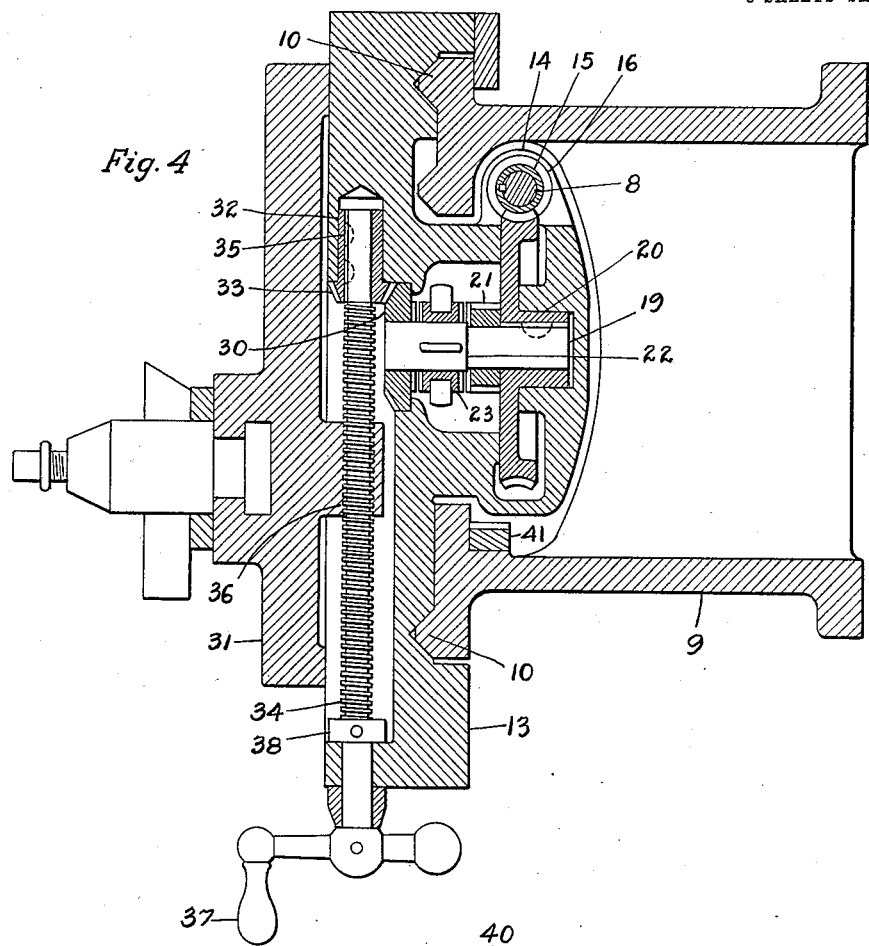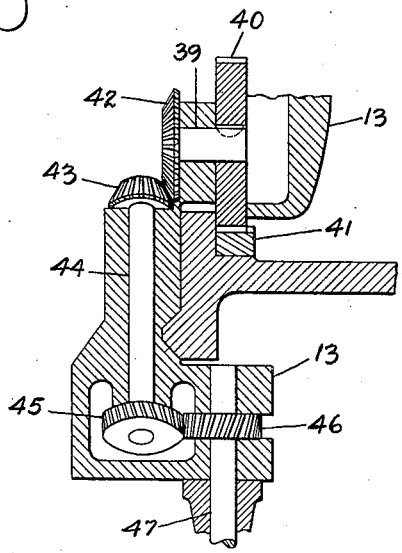

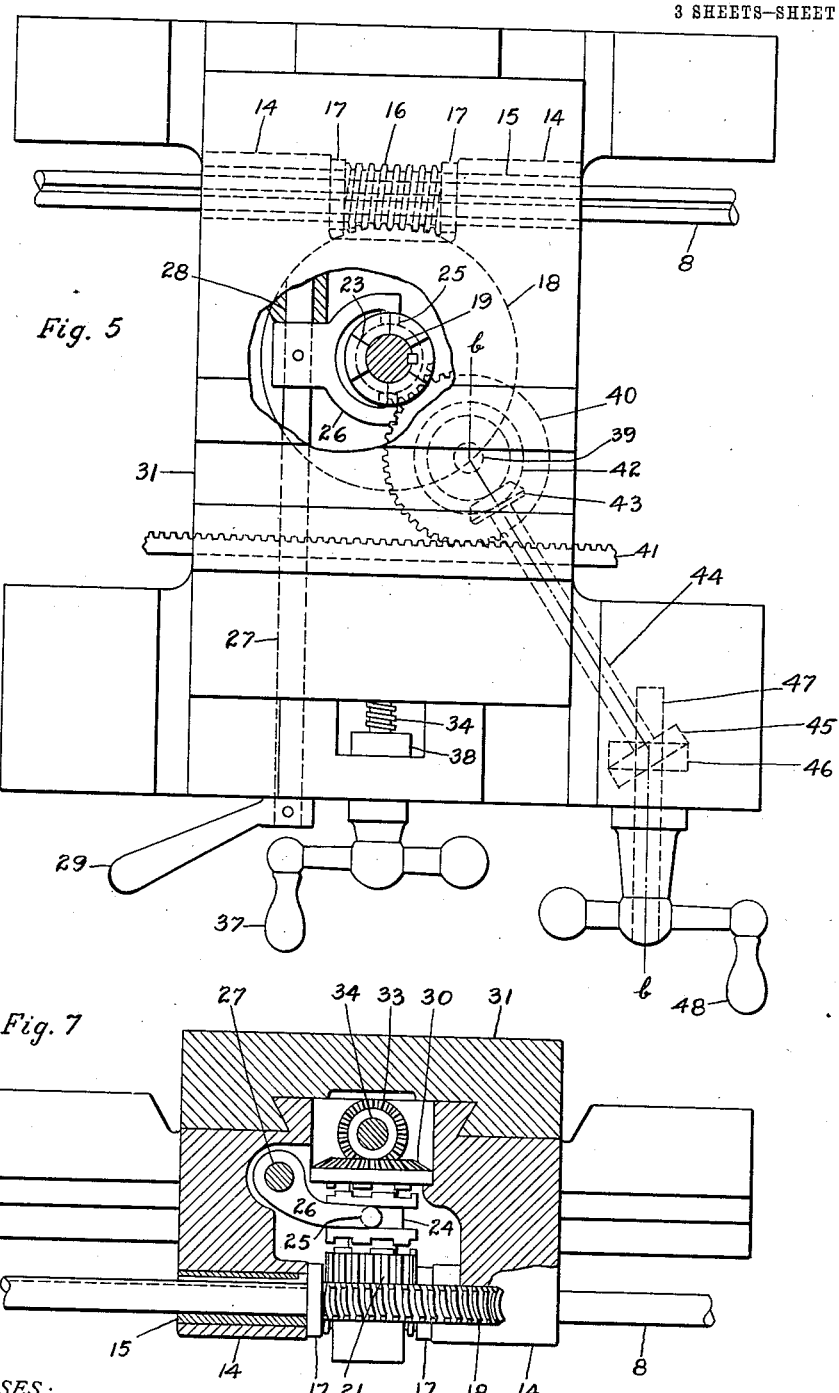

UNITED STATES PATENT OFFICE.

KARL HOEPFNER, OF DAYTON, OHIO.

LATHE.

1,095,278.  Specification of Letters Patent.  Patented May 5, 1914.

Application filed February 3, 1913. Serial No. 746,068.

*To all whom it may concern:*

Be it known that I, KARL HOEPFNER, a subject of the Emperor of Germany, residing at Dayton, county of Montgomery, and State of Ohio, have invented certain new and useful Improvements in Lathes, of which the following is a specification.

My invention relates to improvements in lathes, in which the tool carriage is fed across the work by feed mechanism, mounted in the carriage, between the ways of the bed.

The object of my invention is to simplify the feed mechanism and to eliminate the strain produced by the overhang of the apron, upon which the feed mechanism is mounted.

Other objects will appear hereafter.

I attain these objects by the mechanism illustrated in the accompanying drawings, in which—

Figure 1:
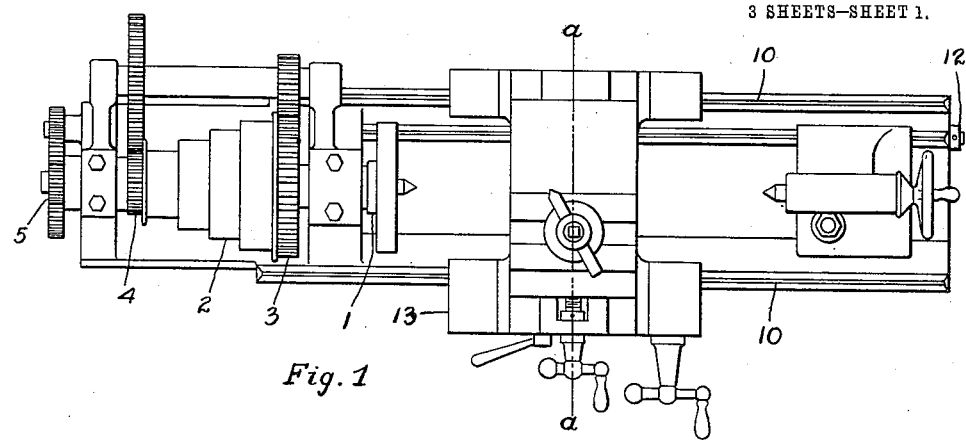
Figure 2:
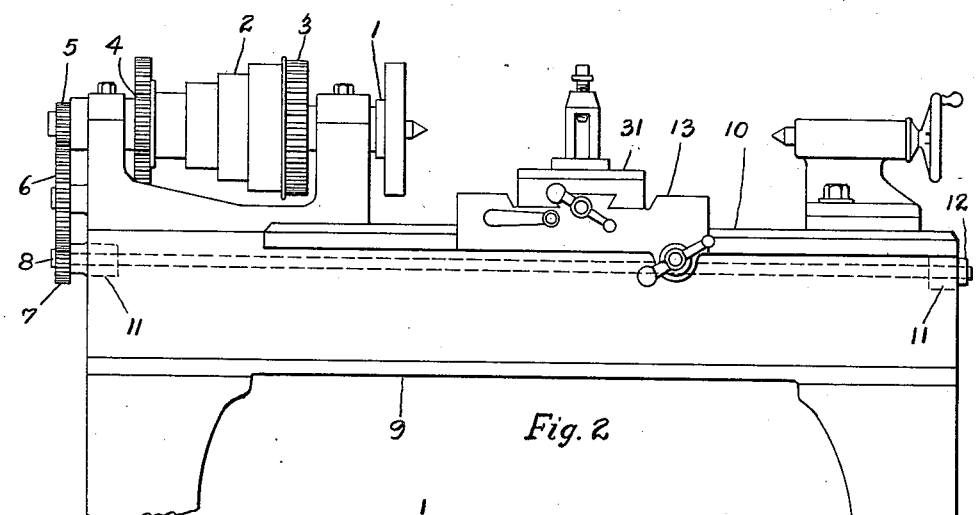

Figure 1 is a top plan view; Fig. 2 is a front elevation; and Fig. 3 an end view of the lathe. Fig. 4 is an enlarged section on the line *a—a* of Fig. 1. Fig. 5 is a top plan view of the carriage, with part of the top broken away. Fig. 6 is a partial section of the carriage on the line *b—b*. Fig. 7 is a vertical section of the carriage showing the clutch arrangement and one of the bearings for the worm.

Referring to the drawings, 1 represents the spindle, upon which is mounted the cone pulley 2, and the gears 3, 4 and 5. All these parts are common construction of a lathe and require no further description.

Figure 3:
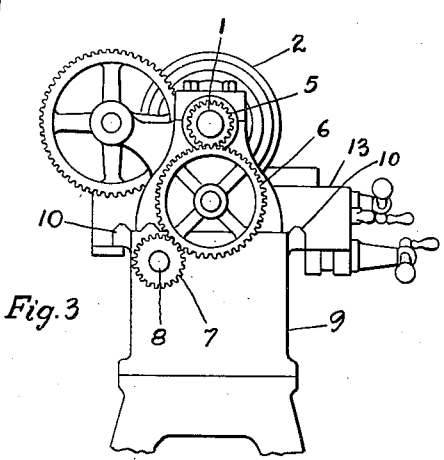

Power is transmitted to the feed shaft 8, from the spindle through gears 6 and 7 placed at the rear end of the lathe, as shown in Fig. 3. The feed shaft 8, is placed inside the bed 9 between the ways 10, and journaled at both ends in bearings 11, integral with the bed. Gear 7 and collar 12 serve as thrust bearings of the feed shaft. The carriage is provided with bearings 14, projecting underneath the ways of the bed. A sleeve 15, splined upon the feed shaft, is provided with worm thread 16, at its central portion and journaled in the bearings 14. Washers 17, prevent longitudinal motion of said worm. In engagement with the worm is a worm wheel 18, secured to a vertical shaft 19, its hub 20 being journaled in the lower portion of the carriage. Above the worm wheel, and loosely mounted on the same shaft is a pinion 21, held in place by the worm wheel underneath, and a shoulder 22, on the shaft 19. A clutch member 23, splined to the shaft 19, is provided with an annular groove 24, to engage pins 25 of the fork 26. Said fork is rigidly mounted upon a rock shaft 27, journaled in the carriage at 28, as shown in Fig. 6. The outer extremity of the rock shaft is provided with a handle 29. From this construction it is apparent that the clutch is actuated by manipulation of the handle 29, and may be engaged with the pinion 21 or a bevel gear 30, either of these being provided with corresponding clutch teeth. The bevel gear 30, is rotatably mounted upon the shaft 19, and journaled in the carriage, as shown in Fig. 4.

In order to transmit motion to the cross slide 31, the following device is provided:— Journaled in bearing 32 of the carriage is a bevel pinion 33, said pinion is in mesh with the bevel gear 30, and secured to a cross feed screw 34, by keys 35. The cross feed screw is threaded into a lug 36 of the cross slide 31, said lug projects into a recess of the carriage. On the outer extremity of the cross feed screw a handle 37, is provided, whereby said screw is manually operated. Since longitudinal motion of the cross feed screw is prevented by the handle 37, and a collar 38, it is obvious that rotation of said screw must cause sliding motion of the cross slide.

Longitudinal movement of the carriage relative to the bed is attained through the following device:—In mesh with the pinion 21, mounted upon a vertical shaft 39, is an intermediate gear 40. Said intermediate gear is also in mesh with a rack 41, rigidly secured to the bed and extending almost the entire length of the bed. To the upper end of the shaft 39, a bevel gear 42, is secured, said bevel gear being in mesh with a bevel pinion 43. Journaled in the carriage at an oblique angle to the line of travel, is a shaft 44, shown in Fig. 5. Said shaft carries at one end the bevel pinion 43, at the other end a helical gear 45, in mesh with another helical gear 46, secured to a shaft 47, journaled in the carriage at the front of the bed. The outer extremity of the shaft 47, is provided with a handle 48, manipulation of said handle will transmit motion to the carriage through the above described device.

If it is desired to feed the carriage by power transmitted through the feed shaft, the clutch 23 is engaged with the pinion 21, thus making it impossible to engage cross feed and longitudinal feed at the same time. Shifting the clutch in a neutral position, as shown in the several views of the drawings, will cease transmission of power to the carriage and cross slide, and both may then be operated manually.

Having thus described my invention, I claim as new, and desire to secure by Letters Patent—

1. In a lathe the combination with the bed, a carriage mounted thereon, a feed shaft, a worm splined to said feed shaft and journaled in said carriage, a vertical shaft carried by said carriage, a worm wheel secured thereto, a pinion rotatably mounted upon said shaft, a rack secured to the bed, operative connection between said pinion and said rack, whereby said carriage is fed longitudinally of the bed, substantially as described.

2. In a lathe the combination with the bed, a carriage mounted thereon, a feed shaft, a worm splined to said feed shaft and journaled in said carriage, a vertical shaft carried by said carriage, a worm wheel secured thereto, a clutch member splined to said shaft, a bevel gear rotatably mounted upon said shaft and supported by said carriage, means for sliding said clutch member to engage or disengage said bevel gear substantially as described.

3. In a lathe the combination with the bed, a carriage mounted thereon, a feed shaft, a worm splined to said feed shaft and journaled in said carriage, a vertical shaft carried by said carriage, a worm wheel secured thereto, a pinion rotatably mounted upon said shaft, a clutch member splined to said shaft, a bevel gear rotatably mounted upon said shaft, means for engaging either the pinion or bevel gear with said clutch member, substantially as described.

4. In a lathe the combination with the bed, a carriage mounted thereon, a feed shaft, a worm splined to said feed shaft and journaled in said carriage, a vertical shaft carried by said carriage, a worm wheel secured thereto, a pinion mounted upon said vertical shaft, a rack secured to the bed, an intermediate gear in operative connection with said pinion and said rack, means for manually operating said intermediate gear, substantially as described.

5. In a lathe, the combination with a feed shaft, the carriage, the cross slide, a worm splined to said feed shaft and journaled in said carriage, a vertical shaft carried by said carriage, a worm wheel secured thereto, a clutch member splined to said shaft, a bevel gear rotatably mounted upon said shaft, and engaging a bevel gear secured to the cross slide screw, means for sliding said clutch member to engage or disengage said bevel gears, substantially as described.

In testimony whereof I have signed my name to this specification in the presence of two subscribing witnesses.

KARL HOEPFNER.

Witnesses:
B. McKenney,
Geo. D. Antrim.

---

Copies of this patent may be obtained for five cents each, by addressing the "Commissioner of Patents, Washington, D. C."